(12) United States Patent
Rousselin

(10) Patent No.: US 6,915,706 B2
(45) Date of Patent: Jul. 12, 2005

(54) VARIABLE FLOW FLOAT FLOWMETER

(75) Inventor: Guy Rousselin, Herry (FR)

(73) Assignee: GCE S.A.S, La Charite sur Loire (FR)

( * ) Notice: Subject to any disclaimer, the term of this patent is extended or adjusted under 35 U.S.C. 154(b) by 0 days.

(21) Appl. No.: 10/671,867

(22) Filed: Sep. 29, 2003

(65) Prior Publication Data

US 2004/0182173 A1 Sep. 23, 2004

(30) Foreign Application Priority Data

Mar. 18, 2003 (FR) .......................................... 03 03577

(51) Int. Cl.⁷ .............................................. G01F 1/22
(52) U.S. Cl. .................................................... 73/861.57
(58) Field of Search ......................... 73/861.57, 861.42, 73/861.52

(56) References Cited

U.S. PATENT DOCUMENTS

| | | | |
|---|---|---|---|
| 2,805,573 A | * 9/1957 | Emmons, III | ............ 73/861.57 |
| 3,812,715 A | * 5/1974 | Whalen | .................... 73/861.57 |
| 4,360,040 A | * 11/1982 | Cove et al. | .............. 137/625.3 |
| 4,380,250 A | * 4/1983 | Stoll | .......................... 137/556 |
| 5,086,645 A | 2/1992 | Deaton | |

FOREIGN PATENT DOCUMENTS

WO    WO 01 33118 A    5/2001

* cited by examiner

Primary Examiner—Edward Lefkowitz
Assistant Examiner—Corey D. Mack
(74) Attorney, Agent, or Firm—Lowe, Hauptman & Berner, LLP

(57) ABSTRACT

A flowmeter has an inlet body including a flow detector and an outlet body including a flow adjuster. The inlet body is fixed to the outlet body and forms a single piece assembly comprising an inlet tube and a measurement tube. The flow adjuster includes a disk turned by a knob. The disk has holes so at least one hole always faces the outlet tube, regardless of the position of the disk, to allow flow distribution without the risk of interrupting it even while flow is adjusted, and enable gradual flow adjustment.

21 Claims, 7 Drawing Sheets

A-A

C-C (1:1)

D-D ( 1 : 1 )

F ( 3 : 1 )

VARIABLE FLOW FLOAT FLOWMETER

FIELD OF INVENTION

The invention relates to a variable flow float flowmeter device provided with a fluid flow regulation device at the outlet from the flowmeter.

BACKGROUND ART

Flowmeters, and particularly rotameters, measure the volume of flowing fluids. These flowmeters are usually used in the medical field when it is important to be able to measure or check that a given volume of fluid is flowing uniformly and in a determined manner. Obviously, this type of instrument can also be used in other domains, such as analysis laboratories, research laboratories, etc.

This type of device usually comprises a body, a flow detector and a flow adjuster. Following the direction of fluid circulation, the body includes fluid circuits between a body inlet, the flow detector, the adjuster and a body outlet. The flow detector usually includes a graduated tube inside of which there is a ball with an appropriate size and weight. The fluid enters through the bottom of the tube and exits through the top. The fluid that enters this type of device is at a low pressure between approximately 0 and 10 bars.

Flowmeters usually include fluid flow adjustment devices, if possible enabling very fine and even very low flow adjustments. These devices associated with flowmeters usually include a valve device with a needle valve, with a metal-to-metal needle or a conical needle closing off a fluid passage orifice. Thus, the fluid passage is partly obstructed by the valve or the needle for which the engagement depth in the passage orifice defines the fluid passage cross section.

However, since this type of device with a conical closing needle is very fine, it is also fragile and is difficult to make in production series. Furthermore, these valve or needle devices tend to develop play in the long term, degrading the adjustment precision and the long-term stability.

Another disadvantage of these devices is the presence of a leak tightness bell included therein on the measurement tube. This bell is an element separate from the rest of the device and requires seals that can cause leak tightness problems.

Fluid distribution flow adjustment installations are also known in which the fluid inlet tube opens onto a disk perforated with a row of holes with increasing diameters that can be placed in turn facing the fluid inlet tube by using a knurled knob that discretely and discontinuously increases the fluid flow. This embodiment does not enable a continuous and gradual increase, since it includes a risk of interrupting the flow when none of the holes in the disk is in front of the fluid inlet tube. This is a major disadvantage when the fluid flow being distributed is vital for a living being.

SUMMARY OF THE INVENTION

Therefore, the purpose of this invention is to overcome the disadvantages of prior art by providing an absolutely leak tight device without any risk of degradation to the adjustment and the flow measurement, and capable of a gradual flow adjustment without any interruption of the flow.

The purpose of the invention is achieved by a flowmeter comprising a fluid inlet including an adaptor, an upper fluid inlet body including a fluid inlet tube, a flow detector including a tube including a ball and a fluid circulation tube. The meter also includes a fluid flow adjuster and a lower body including a fluid outlet tube through which the fluid exits. The upper fluid inlet body is fixed to the lower fluid outlet body. The upper body includes a cast single piece assembly in which an inlet tube, a flow measurement tube communicating with the inlet tube and a fluid circulation tube are formed. Opposite ends of the circulation tube communicate with the measurement tube and a flow adjuster leading towards the outlet tube.

According to another feature, the flow adjuster includes a rotatably driven (preferably metallic) disk that is perforated with holes. At least one hole always faces the outlet tube regardless of the disk position to enable fluid distribution without any risk of interruption even during the flow adjustment, and gradual adjustment of the flow as a function of the diameter of the hole(s) and/or the density of the holes facing the outlet tube.

According to another feature, the upper fluid inlet body, for which the dimensions of the base are the same as the dimensions of the lower fluid outlet body, is fixed to the lower body by screws at its four corners, by gluing, by welding or by clipping.

According to another feature, the fluid inlet tube is perpendicular to the flow measurement tube including the ball.

According to another feature, the flow measurement tube including the ball is also slightly conical.

According to another feature, the flow measurement tube including the ball has a transparent graduated wall on at least one portion, through which a user can see the ball and read the resulting flow.

According to another feature, the flow measurement tube including the ball has a longitudinal axis parallel to the fluid circulation tube.

According to another feature, the fluid circulation tube is slightly conical.

According to another feature, the fluid flow adjuster includes a rotatable driven disk (preferably metallic) through which holes are drilled, in which at least one of the holes faces an outlet tube, regardless of the position of the disk. The body comprises the fluid outlet tube to enable fluid distribution without any risk of interruption even during flow adjustment. Gradual adjustment of the flow is provided by proper selection of the diameter of the hole(s) and/or the density of the holes facing the outlet tube.

According to another feature, the disk includes at least two concentric rows of holes (preferably drilled). The holes and rows have precise dimensions so the holes in each row are offset from the holes in the other row and are at a regular angular spacing. The diameter of the holes encountered in sequence in a given rotation direction varies gradually for each successive hole belonging to two different rows and adjacent along the angular direction. The spacing between successive holes in two rows is less than the diameters of the fluid inlet and outlet tubes in the body. The fluid outlet or inlet tube facing several holes in the disk is associated with a drive to enable gradual flow adjustment without any risk of interrupting the fluid flow.

According to another feature, the disk comprises a single continuous cut out around an angular sector with a circular axis of symmetry. The width of the cut out varies gradually with the angle of the radius of intersection of the cut out.

According to another feature, the drive is a knob in the body fixed in rotation with the metallic disk so that the disk can be rotated to adjust the flow. The knob has holes for enabling fluid circulation as far as the precision holes in the fluid flow adjustment disk.

According to another feature, a hole (preferably drilled) in the lower part of the body forms the fluid outlet hole, having diameter that is greater than the spacing between at least two precision holes in the same row in the disk to assure that the outlet tube is always facing three precision holes in the flow adjustment disk.

According to another feature, the installation is made leak tight by (1) O-rings arranged in grooves formed firstly around the periphery of the cylindrical surface of the knob, and on the internal peripheral surface of a skirt of the knob and the lower and upper parts of the body including the inlet tube and the outlet tube respectively, and (2) by an O-rings between the disk and the outlet tube in a larger diameter drilling than the fluid outlet tube.

According to another feature, the knob is knurled on its external periphery and projects on at least one face of the body so that it can be turned manually.

According to another feature, the body is made in two pieces from moulded plastic material, at least partially enclosing the knob and the disk.

According to another feature, the diameter of the disk is smaller than the diameter of the knob.

According to another feature, the orifices facing the disk face at least three holes.

BRIEF DESCRIPTION OF THE DRAWING

The invention and its characteristics and advantages will be more clearly understood after reading the description with reference to the appended drawings in which.

DETAILED DESCRIPTION OF THE DRAWING

Figure 1:
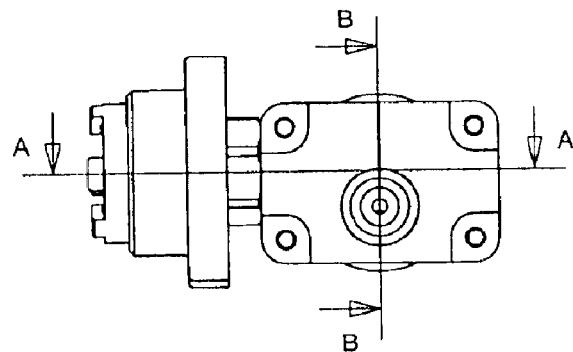
FIG. 1 is a bottom view of a flowmeter in accordance with a preferred embodiment of the invention.
Figure 2A:
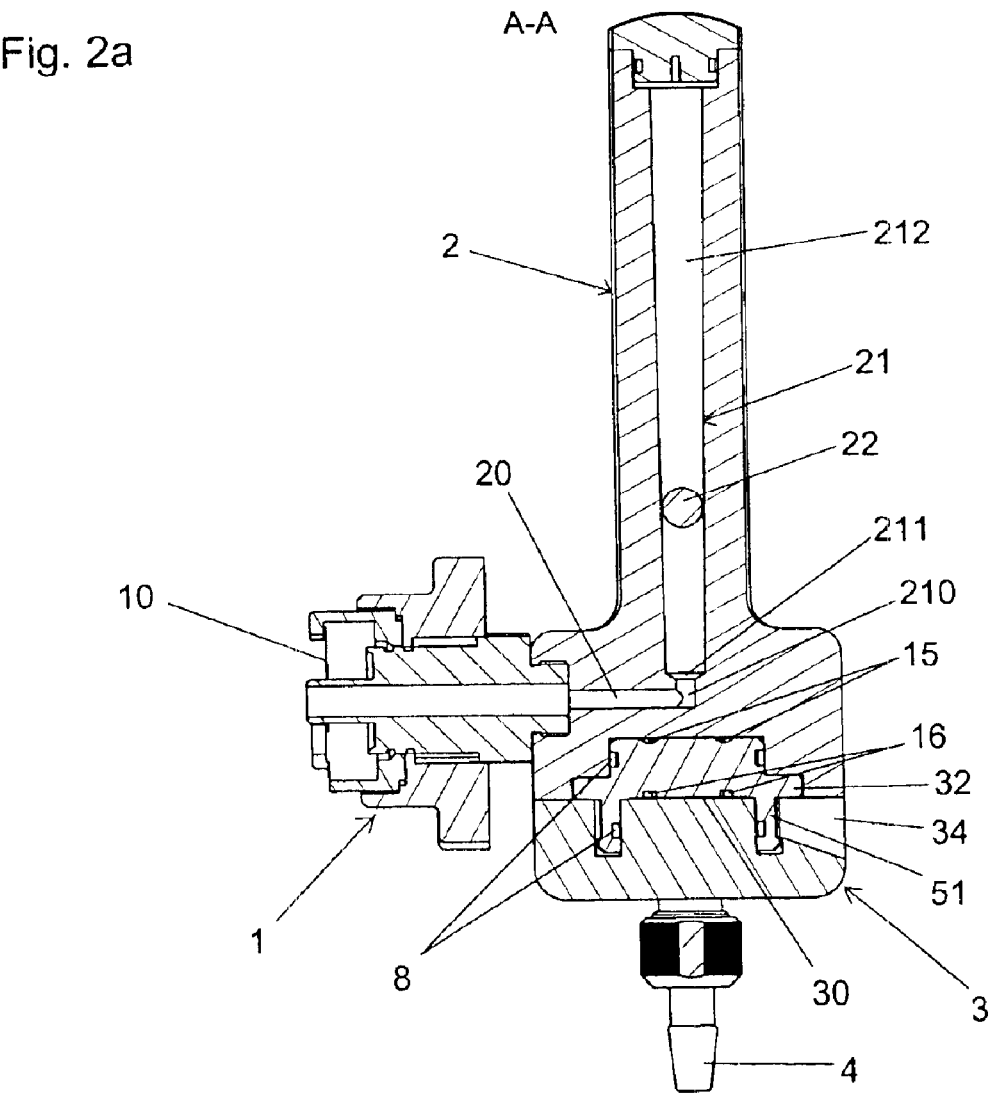
FIG. 2a is a cross sectional view of the flowmeter of FIG. 1 along the A—A axis.
Figure 2B:
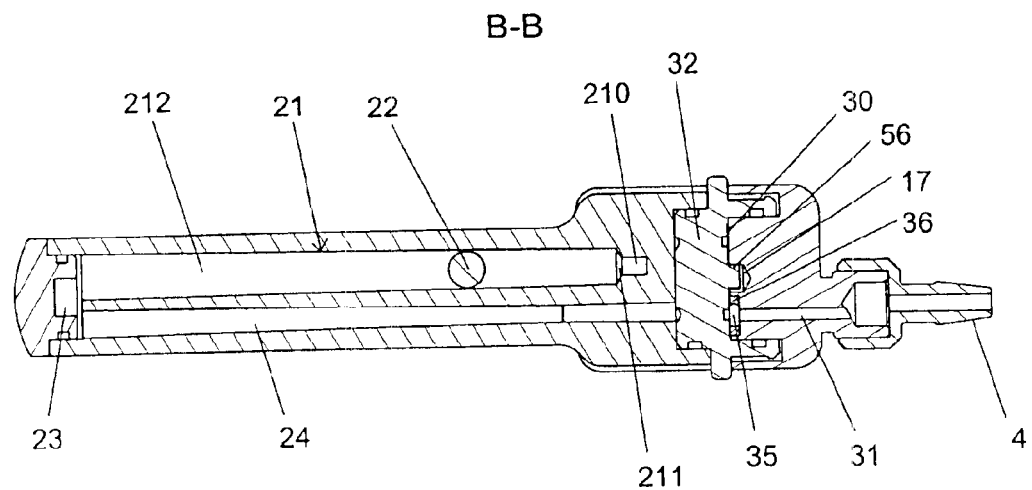
FIG. 2b is a cross sectional view of the flowmeter of FIG. 1 along the B—B axis.
Figure 3:
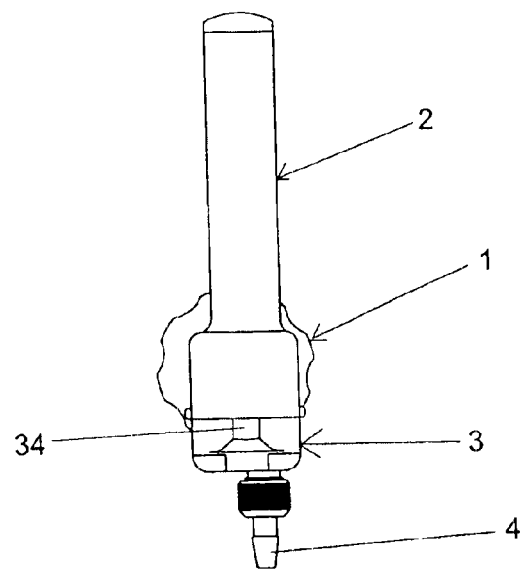
FIG. 3 is a side view of the flowmeter of FIG. 1.
Figure 4:
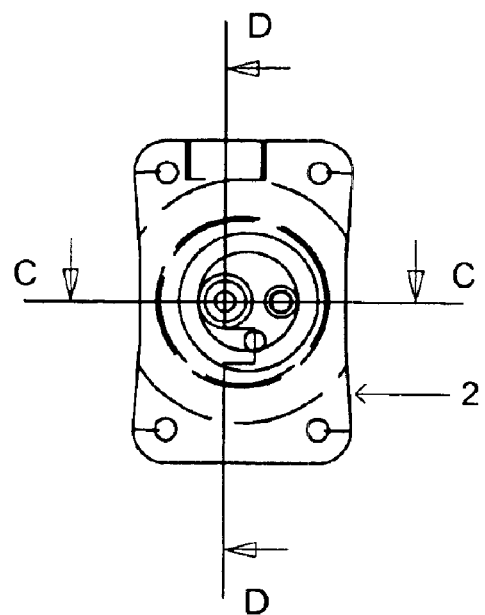
FIG. 4 is a bottom view of the upper body.
Figure 5A:
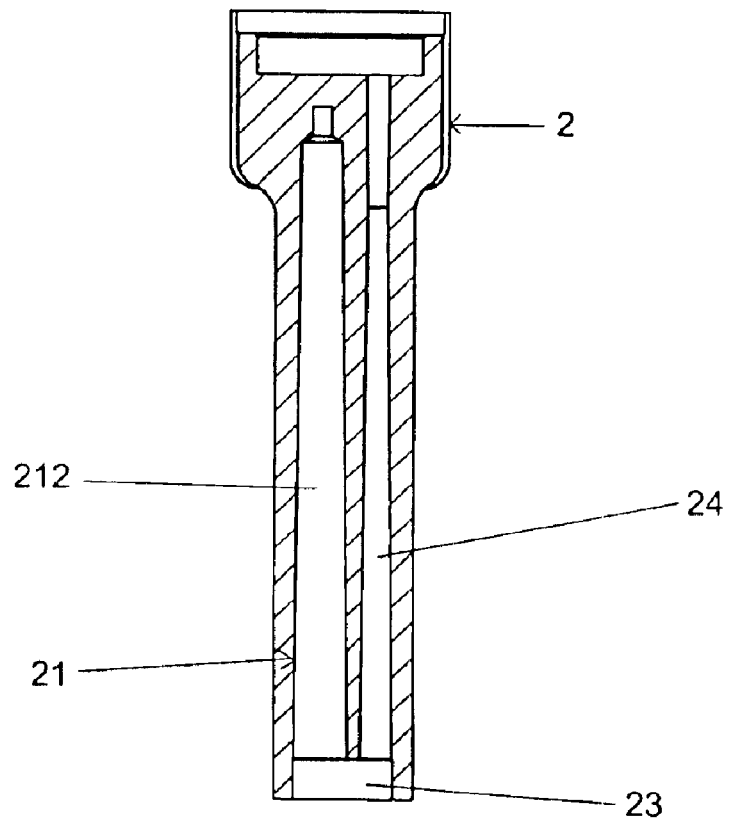
FIG. 5a is a cross-sectional view of the upper body of the flowmeter of FIG. 4, taken along the C—C axis.
Figure 5B:
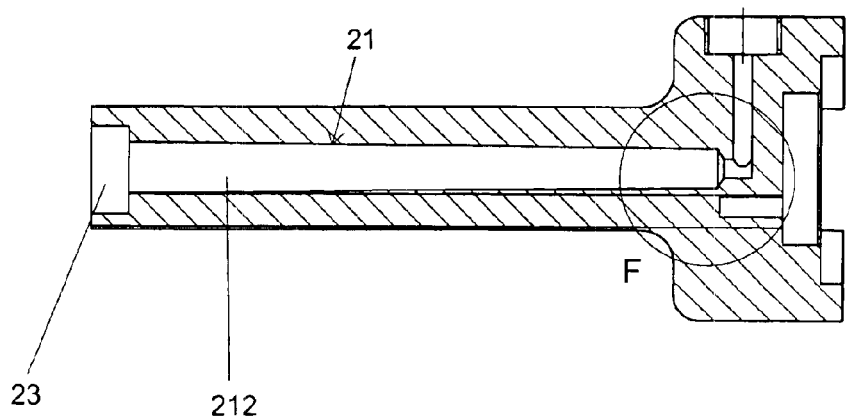
FIG. 5b is a cross sectional view of the upper body of the flowmeter of FIG. 4, taken along the D—D axis.
Figure 5C:
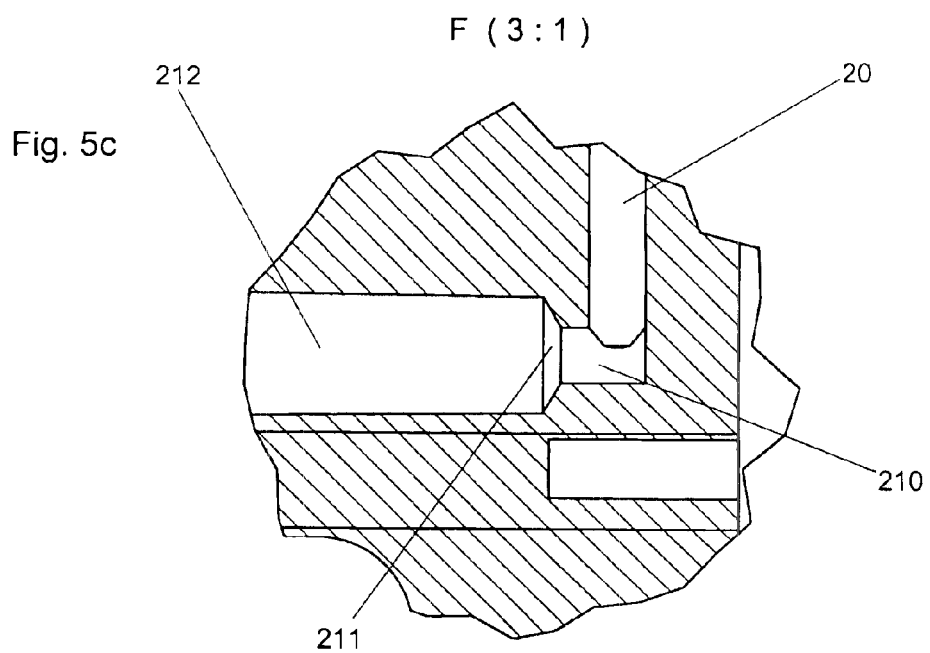
FIG. 5c is an enlarged view of the communication section of the inlet and circulation tubes, respectively.
Figure 6:
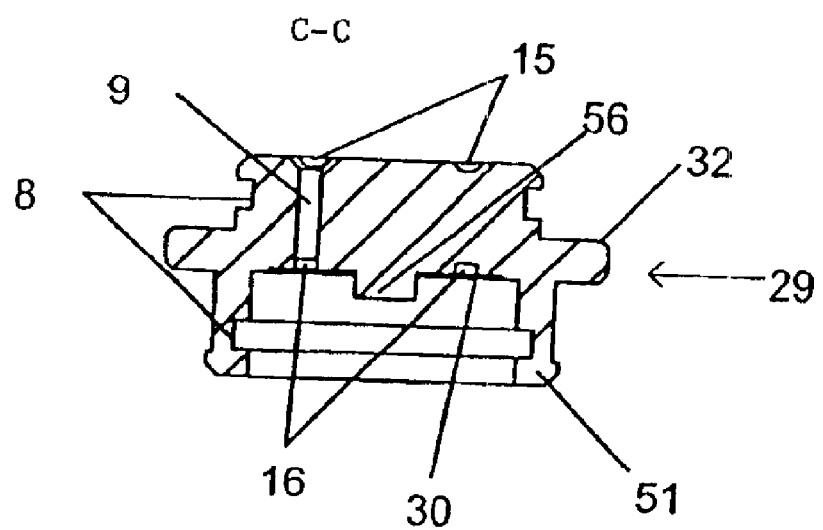
FIG. 6 is a cross sectional view of the knurled knob.

The invention will now be described with reference to FIGS. 1 to 8.

The flowmeter comprises four main parts:

a fluid inlet (1) comprising an adaptor (10);

an upper fluid inlet body (2) including a fluid inlet passage (20), a flow detector (21) including a conical measurement passage (212) including a ball (22) and a conical fluid circulation passage (24);

a fluid flow adjuster (29) including a cylindrical knob (32) knurled around its periphery, projecting on at least one of the faces of the flowmeter so that it can be turned manually and fixed in rotation with a metallic disk (30) through which at least two rows of holes with precise dimensions are drilled; and a lower fluid outlet body (3) including a fluid outlet passage (31).

The adaptor (10) mounts on the fluid source and opens up to the upper fluid inlet body (2).

The upper fluid inlet body (2) forms a rectangular single piece assembly, for example, fixed to the lower fluid outlet body (3). Fluid passes through cavities such as inlet passage (20), measurement passage (21), and circulation passage 24 hollowed out or cast into upper body (2) to form a sealed single piece assembly. The upper fluid inlet body (2), having a base with the same shape and dimensions as the base of lower fluid outlet body (3), is fixed to the lower body (3) by screws at its four corners, by gluing, welding or clipping.

Therefore, the fluid enters through the adaptor (10) into the flowmeter. The fluid passes in the inlet passage (20) that is preferably narrowed upstream of the elbow between inlet (20) and measurement passage (21). The end of the inlet passage (20) has a conical shape so that passage (21) fits into place perpendicular to the cylindrical end (210) of the measurement passage (21). This measurement passage (21), also called a "flow detector", is preferably formed of three parts, a short cylindrical passage (210) forming the insertion end, a 120° enlargement cone (211), and a slightly conical passage (212) inside of which a ball (22) is located. The fluid inlet and outlet of passage (21) are respectively through the bottom and top of the passage (21).

The fluid flowing out of the top of passage (21) passes into a cavity (23) located in the upper part of the upper body (2). Cavity (23) forms the connection between the upper conical part (212) of the measurement passage (21) and the fluid circulation passage (24). These two passages (21 and 24) have parallel longitudinal axes and are located in the same cross sectional plane of the flowmeter along the axis B—B. After passing through the cavity (23), the fluid passes along the circulation passage (24). Therefore, the fluid flow direction in the circulation passage (24) is opposite to the fluid flow direction in the measurement passage (21). The flow rate of the gas passing through outlet passage (31) is read on the scale printed on the passage at the level of the ball. The height of the ball in the passage (21) is the result of the balance between two forces acting on the ball; namely the weight of the ball and the frictional forces of the gas that passes through the small space remaining between the sides of the passage (21) and the ball (22). Consequently, the greater the gas flow is, the higher the ball rises in the passage (21), since the passage (21) is slightly conical, and the passage (21) is disposed vertically with the largest cross section of the passage (21) towards the top of passage (21). The user can see the ball and read the resulting flow by looking at a transparent and graduated wall that extends over at least a portion of the measurement passage (21).

Figure 7:
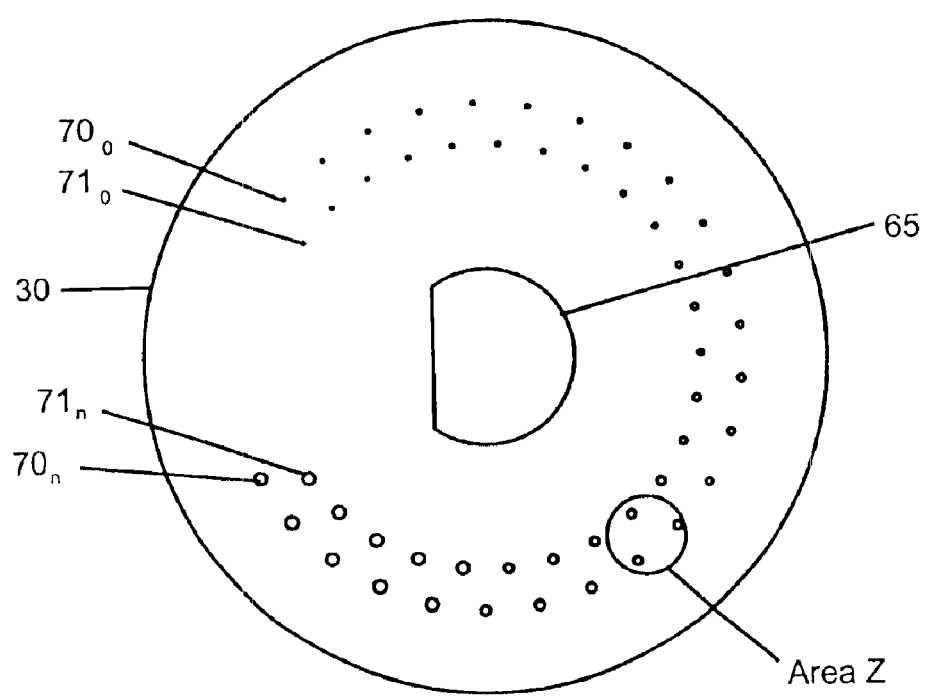
FIG. 7 is a top view of the metallic flow adjustment disk of the meter of FIG. 1.

The fluid then passes through the fluid flow adjuster (29). Adjuster (29) is located between the upper body (2) and the lower body (3) and includes a cylindrical knob (32) knurled around the outside of the cylinder, projecting from at least one of the faces of the flowmeter. Knob (32) is fixed in rotation with a metallic flow adjustment disk (30) including, for example, two rows (70, 71) of drilled holes ($70_0, \ldots, 70_n$ and $71_0, \ldots, 71_n$) (FIG. 7) with precisely defined increasing diameters. In the embodiment of FIG. 7, the diameters of the holes in rows (70) and (71) increase monotonically in increments so that the diameters of adjacent pairs of first and second holes in row (70) are preferably between the diameter of the hole in row (71) that is located between the first and second holes in row (70). The bottom face of knob (32) includes a cylindrical stub (56) having a cross section with a complementary shape to a cut out (65) on the disk (30) or vice versa, whereby the disk is fixedly carried by the knob. The knurled knob (32) is rotated with respect to the body (3) as a result of body (3) including a drilled hole (17) into which stub (56) of the knurled knob is inserted, or vice versa, and by the lower face of the knob (32) includes an extension in the form of a skirt (51), co-operating with a complementary shaped groove (33) formed in the part of the body (3) facing the face of the knob (32) on which the skirt is formed. A notch (34) is formed on one of the faces of the body (3) facing the knob face on which the skirt is formed, for example to make the skirt (51) of the knurled knob (32) visible and so that the required flow reading can be made. The knurled knob (32) is installed in a leak tight manner between the fluid inlet body (2) and outlet body (3) by O-rings placed in each groove (8) formed in the knurled knob (32) on each side of the circulation grooves (15, 16) respectively formed on the upper and lower faces of the knurled knob. A passage (9) is drilled in the knurled knob (32) opening out onto the two tube circulation grooves (15 and 16) enabling fluid circulation between the circulation tube (24) and the precision holes (70, 71) in the metallic flow adjustment disk facing the fluid outlet passage (31). The fluid outlet passage (31) results from drilling a bore in a lower part of the fluid outlet body (3) and opens up onto the flow adjustment disk (30) through a larger diameter drilled hole (35) in which a seal (36) is placed to form a leak tight joint between the disk (30) and the outlet passage (31), while leaving an opening with a sufficient diameter to enable an area Z of the disk (30) to communicate with the outlet passage (31).

In a first embodiment of the invention, illustrated in FIG. 7, the size of the holes ($70_0, \ldots, 70_n$ and $71_0, \ldots, 71_n$) opposite the area Z leading towards the outlet passage increases gradually.

In a second embodiment, the diameter of the holes remains constant but their density facing the area Z varies gradually.

Figure 8:
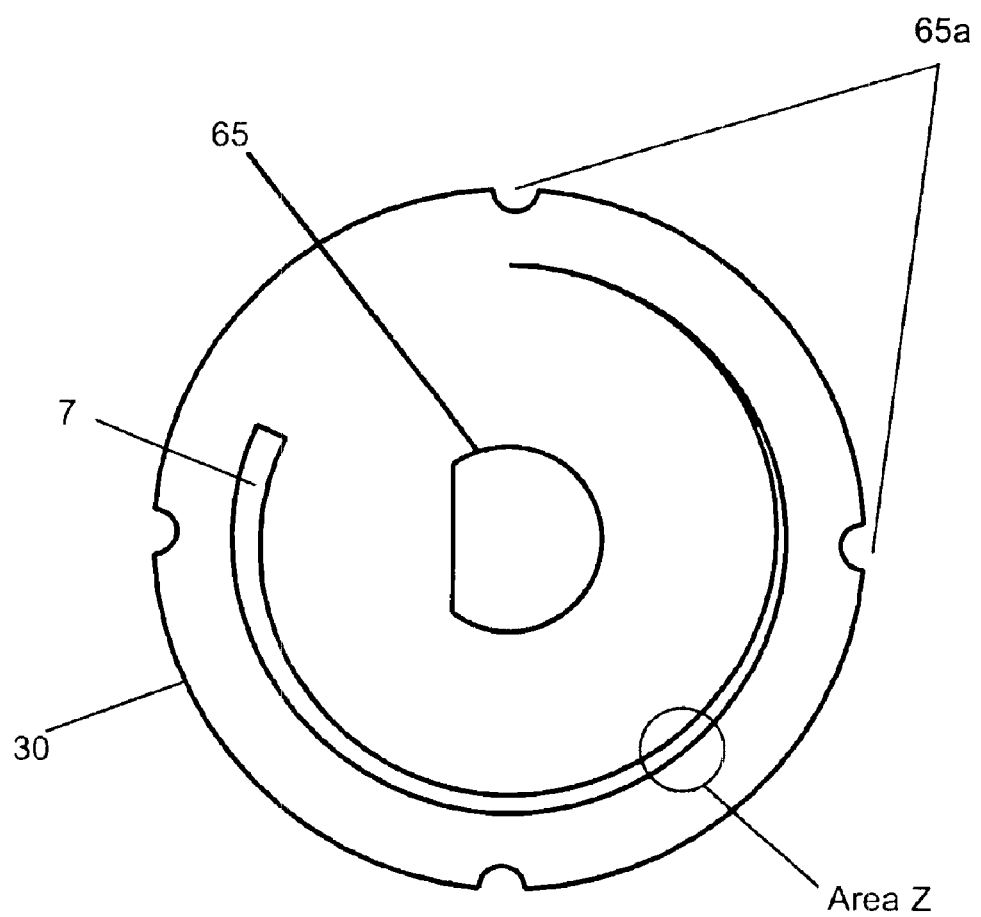
FIG. 8 is a top view of the metallic fluid distribution flow adjustment disk, according to a first variant of the invention, wherein the disk includes a single continuous cut out around an angular sector and a circular axis of symmetry in which the width varies gradually with the angle of the radius of intersection of the cut out.

In a third embodiment, illustrated in FIG. 8, the disk (30) comprises a single continuous cut out (7) over an angular sector. Cut out (7) has a circular axis of symmetry that is coincident with the center of disk (30). The width of cut out (7) varies gradually with the angle of the radius of intersection of the cut out, such that the surface facing the area Z varies gradually.

In another embodiment, the diameter and the density of the holes both vary.

The area Z is shown in FIG. 7 which shows that at least two holes ($70_0, \ldots, 70_n$ and $71_0, \ldots, 71_n$) in a single row and/or in different rows always face the area Z. Therefore, the size of the area Z corresponds to at least the maximum interval between two holes, regardless of the direction in which the holes are located.

During operation, the fluid is transferred through the circulation passage (24) opening up onto a groove (15) formed in the knurled knob (32) that enables fluid circulation as far as the passage (9) in the knurled knob opening up into a groove (16) on the other side of the knurled knob, facing the two rows (70, 71) of precision holes in the metallic flow adjustment disk (30) onto which the fluid outlet passage (31) opens up. The seal between the knurled knob (32) and the fluid inlet body (2) and outlet body (3) is made on each side (8) of the passage (9) in the knurled knob (32) such that all the fluid circulates through the knurled knob alone. The diameter of the knurled knob (32) is greater than the width of the inlet body (2) and the outlet body (3) so that the user can rotate the knurled knob (32) fixed to the adjustment disk (30) in order to adjust the fluid flow by placing several precision holes ($70_0, \ldots, 70_n$ and $71_0, \ldots, 71_n$) with different diameters (70, 71) facing the fluid outlet passage (31), the diameter of which is greater than the space between two precision holes in the disk (30). The fluid outlet passage (31) opens up onto a connector for a fluid distribution tube (4).

Persons of ordinary skill in the art will find it obvious that this invention can be used with embodiments in many other specific forms without going outside the scope of the invention as claimed. Consequently, these embodiments must be considered as being for illustration purposes, but they can be modified within the scope of the attached claims, and the invention must not be limited to the details given above.

What is claimed is:

1. A variable flow float flowmeter comprising a fluid inlet including an adaptor, an upper fluid inlet body including a fluid inlet passage and a flow detector including a fluid circulation passage and a flow measurement passage comprising a vertical conical passage including a sphere, a lower body arranged for enabling the fluid to exit through it, an adjuster for the fluid flow, and a fluid outlet passage, the upper fluid inlet body being fixed to the lower fluid outlet body, the upper body including a cast single piece assembly arranged so the inlet passage leads towards the flow measurement passage communicating with one end of the fluid circulation passage which also communicates, through its other end, with the flow adjuster leading towards the outlet passage.

2. A variable flow float flowmeter according to claim 1, wherein the flow adjuster includes a disk arranged to be rotatably driven, the disk including holes with diameters and spacing between each other, the diameters and spacing of the holes being arranged so that during fluid distribution, the whole diameter of at least one hole always directly faces the outlet passage regardless of the position of the disk, to enable uninterrupted fluid distribution, even during flow adjustment, the disk and the outer passage being arranged to provide gradual adjustment of the flow in response to turning of the disk as a function of progressive change in the diameter of at least one of the hole(s) and in the density of the holes facing the outlet passage.

3. A variable flow float flowmeter according to claim 2, wherein the holes are perforated in the disk.

4. A variable flow float flowmeter according to claim 2, wherein the disk includes at least two concentric rows of holes with precise dimensions, the holes in each row being arranged to be offset from the holes in the other row and being at a regular angular spacing, the diameter of the holes encountered in sequence in a given rotation direction varying gradually for each successive hole belonging to two different rows and adjacent along the angular direction, the spacing between successive holes in two rows being less than the diameters of the fluid inlet and outlet passages in the body, the fluid outlet or inlet passage facing several holes in the disk to enable gradual flow adjustment without interrupting the fluid flow in response to turning of the disk.

5. A variable flow float flowmeter according to claim 2, further including a knob for turning in the body fixed in rotation with the disk so that the knob can be turned to adjust the flow, a passage in the knob enabling fluid circulation as far as the precision holes in the fluid flow adjustment disk.

6. A variable flow float flowmeter according to claim 5, further including O-rings arranged in grooves in the periphery of the cylindrical surface of the knob, and on the internal peripheral surface of a skirt of the knob and the lower and upper parts of the body including the inlet passage and the outlet passage respectively, and a seal between the disk and the outlet passage in a larger diameter hole than the fluid outlet passage.

7. A variable flow float flowmeter according to claim 5, wherein the knob is knurled on its external periphery and projects on at least one face of the body so that it can be turned manually.

8. A variable flow float flowmeter according to claim 5, wherein the body includes two pieces of molded plastic material, at least partially enclosing the knob and the disk.

9. A variable flow float flowmeter according to claim 5, wherein the diameter of the disk is smaller than the diameter of the knob.

10. A variable flow float flowmeter according to claim 2, wherein the outer passage facing the disk faces at least three of the holes.

11. A variable flow float flowmeter according to claim 1, wherein the upper fluid inlet body base has dimensions that are the same as the dimensions of the lower fluid outlet body, the upper fluid inlet body being fixed to the lower body by screws at its four corners, by gluing, by welding or by clipping.

12. A variable flow float flowmeter according to claim 1, wherein the fluid inlet passage is substantially perpendicular to the flow measurement passage including the sphere.

13. A variable flow float flowmeter according to claim 1, wherein the flow measurement passage including the sphere is slightly conical.

14. A variable flow float flowmeter according to claim 1, wherein the flow measurement passage including the ball sphere includes a transparent graduated wall on at least one portion, the wall being arranged so that a user can see the sphere and read the resulting flow.

15. A variable flow float flowmeter according to claim 1, wherein the flow measurement passage and the fluid circulation passage have parallel longitudinal axes.

16. A variable flow float flowmeter according to claim 1, wherein the fluid circulation passage is slightly conical.

17. A variable flow float flowmeter according to claim 1, wherein the disk includes at least two concentric rows of holes with precise dimensions and a hole in a lower part of the body forms the fluid outlet passage, the diameter of the outlet passage being greater than the spacing between at least two holes in the same row in the disk to assure that the outlet passage is always facing three holes in the disk.

18. A variable flow float flowmeter comprising a fluid inlet including an adaptor, an upper fluid inlet body including a fluid inlet passage, a flow detector including a slightly conical fluid circulation passage and a flow measurement passage comprising a vertical conical passage including a sphere, and a lower body arranged for enabling the fluid to exit through it, an adjuster for the fluid flow, a fluid outlet passage, the upper fluid inlet body being fixed to the lower fluid outlet body, the upper body including a cast single piece assembly having an inlet passage, the flow measurement passage communicating with the inlet passage and a fluid circulation passage, the passages being formed and arranged for enabling fluid to communicate through one end with the flow measurement passage and through the other end with the flow adjuster leading towards the outlet passage.

19. A variable flow float flowmeter comprising a fluid inlet including an adaptor, an upper fluid inlet body including a fluid inlet passage, a flow detector including a fluid circulation passage and a flow measurement passage comprising a vertical conical passage including a sphere, and a lower body arranged for enabling the fluid to exit through it, an adjuster for the fluid flow, a fluid outlet passage, the upper fluid inlet body being fixed to the lower fluid outlet body, the upper body including a cast single piece assembly having an inlet passage, the flow measurement passage communicating with the inlet passage and a fluid circulation passage, the passages being formed and arranged for enabling fluid to communicate through one end with the measurement passage and through the other end with the flow adjuster leading towards the outlet passage, the flow adjuster including a disk arranged to be rotatably driven, the disk including holes arranged so at least one hole always faces the outlet passage, regardless of the position of the disk, to enable fluid distribution without interruption even during the flow adjustment, at least one of the diameter of the hole(s) and the density of the holes facing the outlet passage being arranged to provide gradual adjustment of the flow in response to turning of the disk, the disk including at least two concentric rows of holes with precise dimensions, the holes in each row being arranged to be offset from the holes in the other row and being at a regular angular spacing, the diameter of the holes encountered in sequence in a given rotation direction varying gradually for each successive hole belonging to two different rows and adjacent along the angular direction, the spacing between successive holes in two rows being less than the diameters of the fluid inlet and outlet passages in the body, the fluid outlet or inlet passage facing several holes in the disk to enable gradual flow adjustment without interrupting the fluid flow in response to turning of the disk.

20. A variable flow float flowmeter comprising a fluid inlet including an adaptor, an upper fluid inlet body including a fluid inlet passage and a flow detector including a fluid circulation passage and a flow measurement passage comprising a vertical conical passage including a sphere, a lower body arranged for enabling the fluid to exit through it, an adjuster for the fluid flow, and a fluid outlet passage, the upper fluid inlet body being fixed to the lower fluid outlet body, the upper body including a cast single piece assembly arranged so the inlet passage leads towards the flow measurement passage communicating with one end of the fluid circulation passage through its other end, with the flow adjuster leading towards the outlet passage, the flow adjuster including a disk arranged to be rotatably driven, the disk including holes with diameters and spacing between each other, the diameters and spacing of the holes being arranged so that during fluid distribution, the whole diameter of at least one hole always directly faces the outlet passage regardless of the position of the disk, to enable uninterrupted fluid distribution, even during flow adjustment, the disk and the outer passage being arranged to provide gradual adjustment of the flow in response to turning of the disk as a function of progressive change in the diameter of at least one of the hole(s) and in the density of the holes facing the outlet passage, the flowmeter further including a knob for turning in the body fixed in rotation with the disk so that the knob can be turned to adjust the flow, a passage in the knob enabling fluid circulation as far as the precision holes in the fluid flow adjustment disk, and the flowmeter further including O-rings arranged in grooves in the periphery of the cylindrical surface of the knob, and on the internal peripheral surface of a skirt of the knob and the lower and upper parts of the body including the inlet passage and the outlet passage respectively, and a seal between the disk and the outlet passage in a larger diameter hole than the fluid outlet passage.

21. A variable flow float flowmeter comprisisng a fluid inlet including an adaptor, an upper fluid inlet body including a fluid inlet passage and a flow detector including a fluid circulation passage and a flow measurement passage comprising a vertical conical passage including a sphere, a lower body arranged for enabling the fluid to exit through it, an adjuster for the fluid flow, and a fluid outlet passage, the upper fluid inlet body being fixed to the lower fluid outlet body, the upper body including a cast single piece assembly arranged so the inlet passage leads towards the flow measurement passage communicating with one end of the fluid circulation passage which communicates, through its other end, with the flow adjuster leading towards the outlet passage, the flow adjuster including a disk arranged to be rotatably driven, the disk including holes with diameters and spacing between each other, the diameters and spacing of the holes being arranged so that during fluid distribution, the whole diameter of a least one hole always directly faces the outlet passage regardless of the position of the disk, to enable uninterrupted fluid distribution, even during flow adjustment, the disk and the outer passage being arranged to provide gradual adjustment of the flow in response to turning of the disk as a function of progressive change in the diameter of at least one of the hole(s) and in the density of the holes facing the outlet passage, the flowmeter further including a knob for turning in the body fixed in rotation with the disk so that the knob can be turned to adjust the flow, a passage in the knob enabling fluid circulation as far as the precision holes in the fluid flow adjustment disk, the body including two pieces of molded plastic material, at least partially enclosing the knob and the disk.

* * * * *